United States Patent [19]

Ahrens

[11] Patent Number: 4,559,905
[45] Date of Patent: Dec. 24, 1985

[54] LIVESTOCK WATERING TANK

[75] Inventor: Claude W. Ahrens, Grinnell, Iowa

[73] Assignee: Ahrens Agricultural Industries Co., Grinnell, Iowa

[21] Appl. No.: 652,212

[22] Filed: Sep. 20, 1984

[51] Int. Cl.⁴ .............................................. A01K 7/00
[52] U.S. Cl. ......................................... 119/73; 119/75
[58] Field of Search .................................... 119/73, 75

[56] References Cited

U.S. PATENT DOCUMENTS

| | | | |
|---|---|---|---|
| 1,912,530 | 6/1933 | Kubler | 119/75 X |
| 3,745,977 | 7/1973 | Martin | 119/73 |
| 4,100,885 | 7/1978 | Kapplinger | 119/73 |
| 4,320,720 | 3/1982 | Streed | 119/73 |

Primary Examiner—Hugh R. Chamblee

Attorney, Agent, or Firm—Zarley, McKee, Thomte, Voorhees & Sease

[57] ABSTRACT

The animal watering tank of the present invention includes a top, a bottom, and a sidewall of double-walled construction filled with insulative material. The top of the tank includes a dome portion which provides an air chamber for housing the water inlet valve of the tank. A water access opening in the top of the tank is normally closed by a buoyant spherical float. An animal desiring a drink can obtain water by pushing downwardly on the float with his head such that the float rolls away from the opening along a converging track attached to the interior surface of the top of the tank so as to present water to the animal. When the animal is finished drinking, the float naturally rolls back into thermally sealing engagement with the access opening. Drainage means and overflow pipes are also provided in the tank.

11 Claims, 13 Drawing Figures

U.S. Patent  Dec. 24, 1985  Sheet 1 of 3  4,559,905
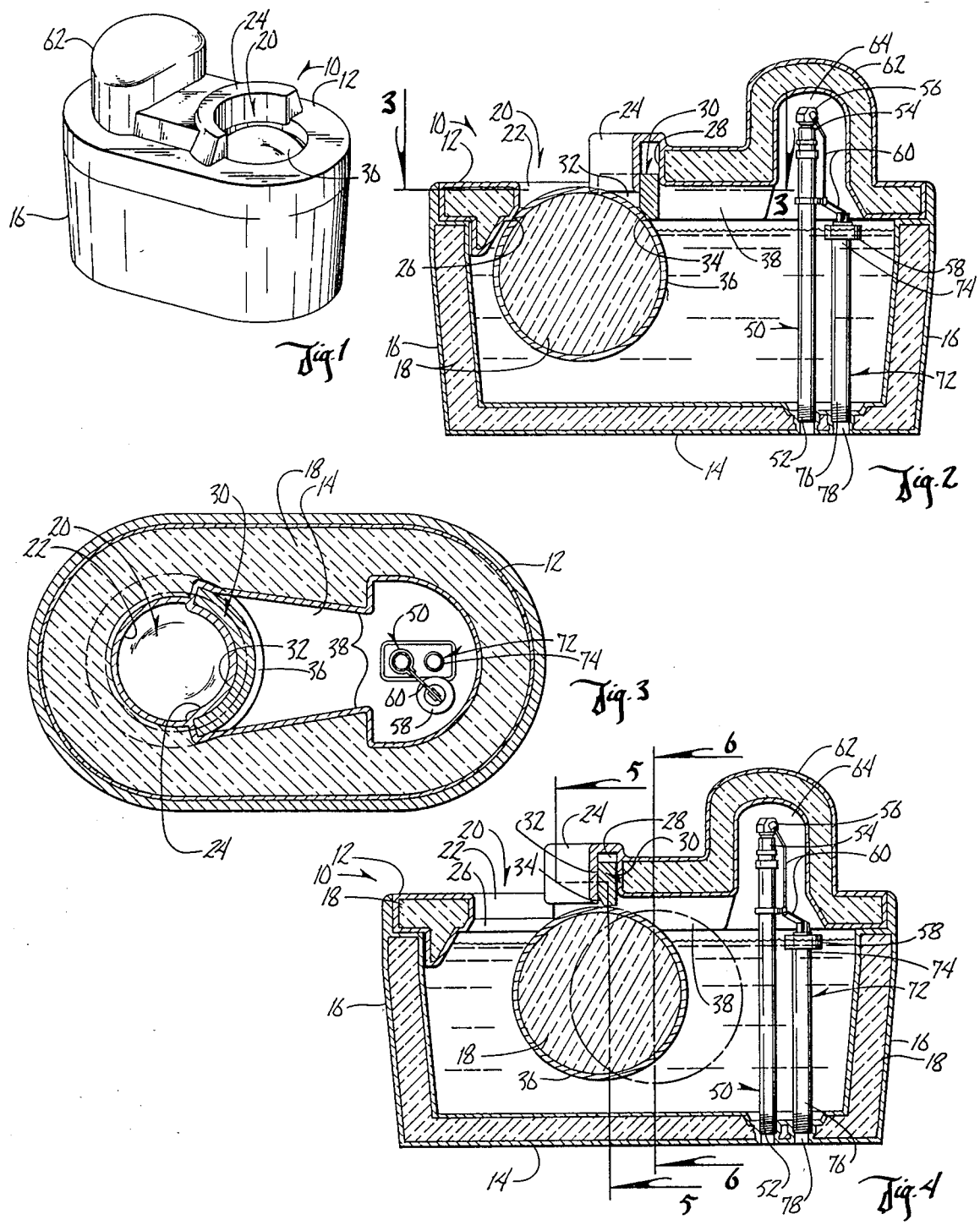

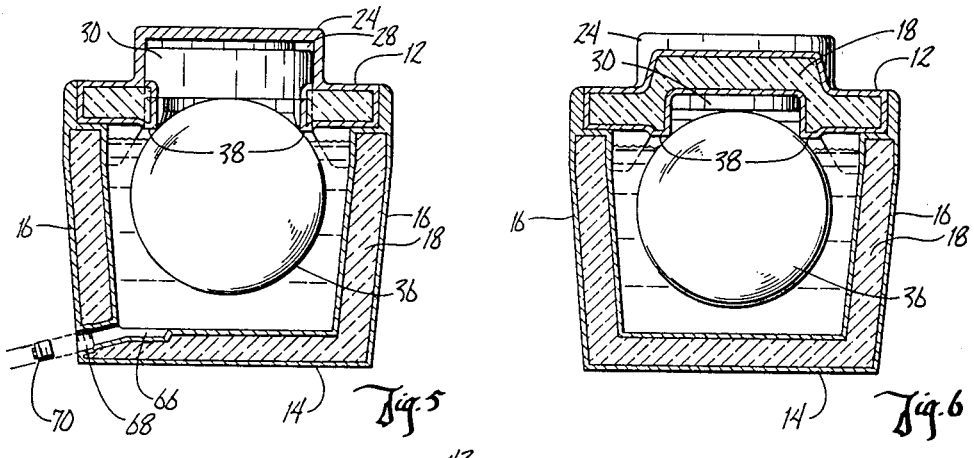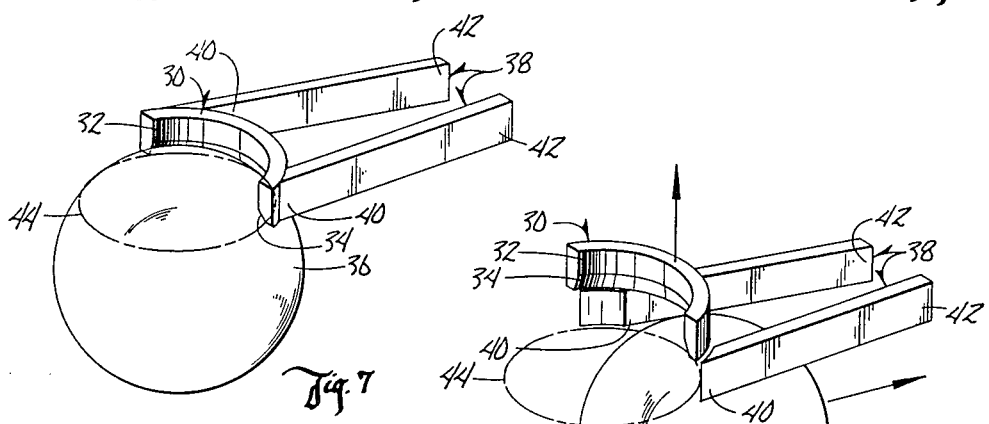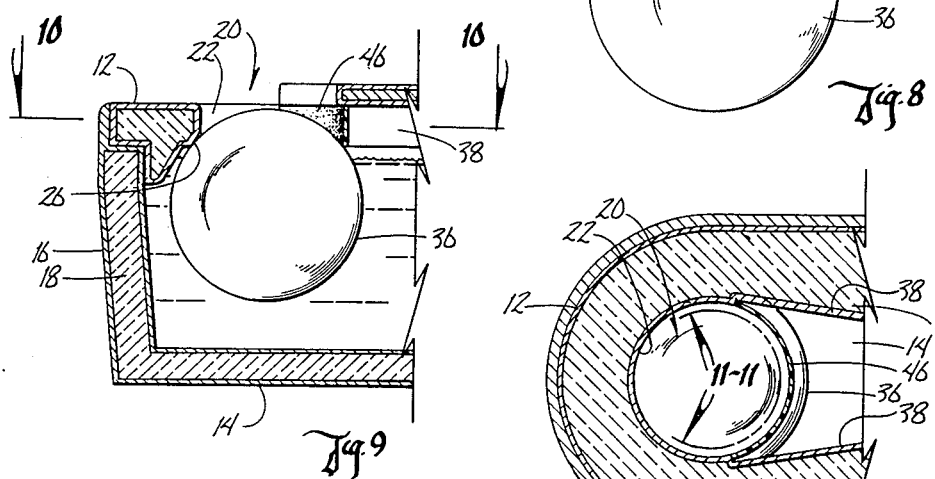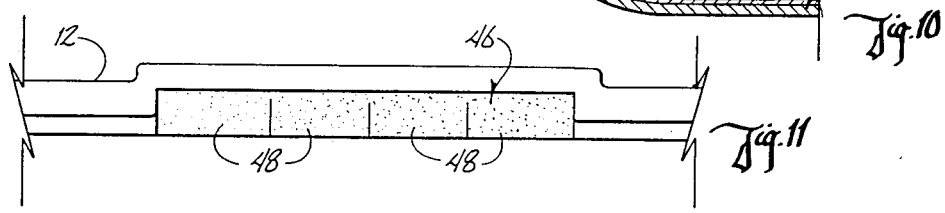

LIVESTOCK WATERING TANK

BACKGROUND OF THE INVENTION

Conventional livestock watering tanks generally utilize spring-loaded doors or buoyant floats to close the opening in the tank so that the water in the tank is thermally sealed from subfreezing ambient air. Such doors or float may be pushed away from the opening by the animal's head thereby presenting water to the animal for drinking. However, these closures are subject to problems. For example, springloaded doors have a tendency to close upon the head of the animal or otherwise pinch the animal during drinking. Also, the buoyant floats are generally flat and can become misaligned such that the opening is not completely sealed. Also, the flat float requires the animal to exert and maintain considerable force on the float with its nose or muzzle to submerge the float to provide access to the water. The animal can also bite a flat float thus presenting a hazard to the animal, as well as damage to the float.

Therefore, a primary objective of the present invention is the provision of a livestock watering tank having a spherical float which is easily moved by an animal to provide access to the drinking water.

A further objective of the present invention is the provision of a livestock watering tank having a spherical float which assures complete closure of the drinking opening when the animal is not drinking.

A further objective of the present invention is the provision of a livestock watering tank having a spherical float which can be rolled away from the access opening with a minimum of effort by the animal.

A further objective of the present invention is the provision of a livestock watering tank which is economical to manufacture, efficient and durable in use.

These and other objectives will become apparent in the following description of the present invention.

SUMMARY OF THE INVENTION

The livestock watering apparatus of the present invention includes an insulated tank with a top, bottom and side walls. The top has an opening extending therethrough. A buoyant spherical float normally closes the opening and is rollable away from the opening along converging tracks in response to downward force applied by the head of an animal seeking a drink of water. When the animal releases the downward force, the float naturally rolls back along the tracks into sealing engagement with the opening. A water inlet system is provided so that when the water level in the tank drops to a predetermined level, additional water from a water source is provided to the tank. Tha tank also includes a drain and an overflow outlet.

BRIEF DESCRIPTION OF THE DRAWINGS

FIG. 1 is a perspective view of the livestock watering tank of the present invention having one water-access opening therein.

FIG. 2 is a side-sectional elevation view of the tank of FIG. 1.

FIG. 3 is a sectional top plan view of the tank taken along line 3—3 of FIG. 2.

FIG. 4 is a side-sectional elevation view of the tank similar to FIG. 3 showing the spherical float rolled away from the opening.

FIG. 5 is a sectional end view taken along line 5—5 of FIG. 4.

FIG. 6 is a sectional end view taken along line 6—6 of FIG. 4.

FIG. 7 is a perspective view of the track means of the tank with the float being in its normal sealing position.

FIG. 8 is a view similar to FIG. 7 with the float being rolled away from its sealing position.

FIG. 9 is a partial sectional side elevation view showing an alternative sealing membrance.

FIG. 10 is a partial sectional top plan view taken along line 10—10 of FIG. 9.

FIG. 11 is a view taken along line 11—11 of FIG. 10.

DETAILED DESCRIPTION OF THE DRAWINGS

Figure 12:
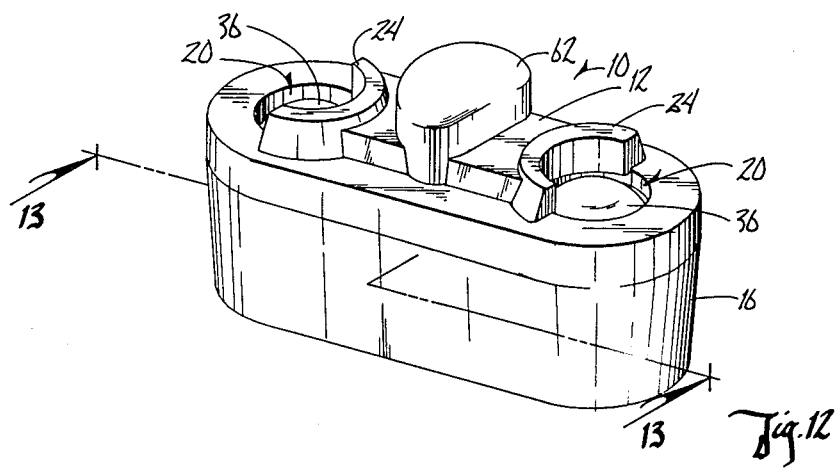
FIG. 12 is a perspective view of a modified livestock watering tank having two water-access openings therein.

The livestock watering tank of the present invention is generally designated by the numeral 10. Tank 10 includes a top 12, a bottom 14, and a sidewall 16. Each of the top, bottom, and sidewall is of double-walled construction so as to have interior and exterior surfaces and is filled with a insulative material 18 with a preferred R value of approximately 38. Sidewall 16 is integrally formed with bottom 14, while top 12 is removable from sidewall 16.

Figure 13:
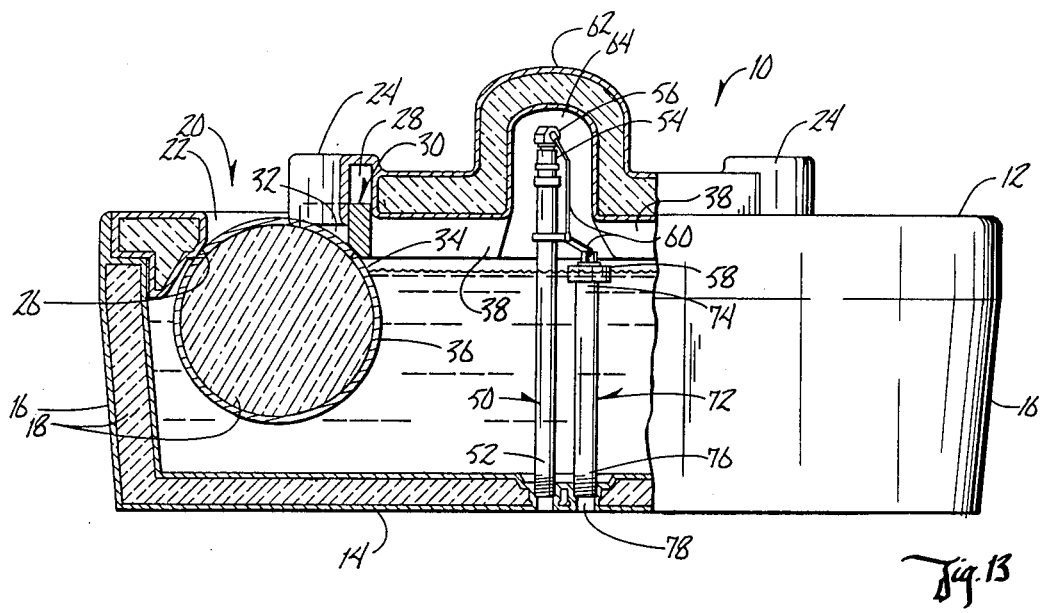
FIG. 13 is a sectional side elevation view taken along line 13—13 of FIG. 12.

Top 12 of tank 10 includes at least one opening 20 therethrough which provides access to the water contained within tank 10. FIGS. 1-10 show a tank having one access opening while the tank shown in FIGS. 12 and 13 has two access openings. The perimeter of opening 20 is defined by a curved vertical wall 22 extending through top 12 and an upwardly extending curved portion 24 attached to or integrally formed with top 12. Vertical wall 22 terminates at its lower edge with a beveled edge 26.

Curved portion 24 of top 12 is hollow so as to define a guide channel 28. A curved sealing member 30 is matingly received within channel 28 and is free to move upwardly and downwardly therein. Sealing member 30 includes a curved inner wall surface 32 which terminates in an outwardly beveled edge 34 both of which align with vertical wall 22 and beveled edge 26 of opening 20, respectively. Sealing member 30 may be constructed of insulative material.

Opening 22 is normally closed by a buoyant spherical float 36 designed to thermally seal the opening. Float 36 is filled with or constructed of insulative material 18. The water level in tank 10 is maintained at a sufficient level to force the surface of float 36 into mating engagement with beveled edge 26 of opening 20. During such engagement between float 36 and beveled edge 26, sealing member 30 drops downwardly within channel 28 such that beveled edge 34 of sealing member 30 also engages the surface of float 36 thereby providing a thermal seal between the water in tank 10 and ambient air.

A pair of elongated flanges 38 each having a first end 40 and a second end 42 are secured to or integrally formed with top 12 on the interior surface thereof. First ends 40 of flanges 38 are adjacent opening 20 while second ends 42 of flanges 38 are remote from opening 20 and are spaced closer to one another than are first ends 40 such that flanges 38 define a converging track upon which float 36 rolls away from opening 20 when an animal desires a drink of water from tank 10.

More particularly, to get a drink, an animal need merely push against float 36 which rolls along flanges 38 out of engagement with beveled edges 26 and 34 and away from opening 20 such that water is presented to the animal for drinking. As float 36 begins to roll away from opening 20, seal member 30 is forced upwardly within guide channel 28 by float 36. Also, as float 36 rolls along flanges 38, a greater portion of the float is submerged into the water in tank 10 due to the converging second ends 42 of flanges 38, as seen in FIGS. 4–6. When the animal finishes drinking and releases the force on float 36, the buoyancy of the float causes it to naturally roll along flanges 38 towards first ends 40 thereof until the surface of the float engages beveled edge 26 of opening 20 and seal member 30 drops downwardly within guide channel 28 such that beveled edge 34 thereof is also in engagement with the surface of float 36. Thus, the thermal seal between the surface of float 36 and opening 20 is assured when an animal is not drinking from tank 10.

With respect to FIGS. 7 and 8, the circular dotted line 44 therein represents the position of opening 20. FIG. 7 shows float 36 in thermally sealing engagement with opening 20. In comparison, FIG. 8 shows float 36 rolled away from opening 20 along flanges 38 with seal member 30 moved upwardly accordingly.

FIGS. 9–11 show an alternative embodiment of tank 10 wherein curved portion 24 with guide channel 28 and seal member 30 have been replaced by a flexible sealing membrane 46 constructed of soft rubber or similar material. Sealing membrane 46 is attached to the interior surface of top 12 in a curved manner so as to matingly engage the surface of float 36 when the float is in a position closing opening 20. Sealing membrane 46 has a plurality of sections 48, as seen in FIG. 11, which permits float 36 to roll awway from and toward opening 20, as previously described, when an animal desires to drink.

In getting a drink, an animal initially need only exert minimal downward force upon float 36 to commence the rolling action of the float. Typically, such downward force is applied by the snout or mouth of the animal. After float 36 is moved away from opening 20, the animal can hold float 36 out of the way with the side of its jaw while drinking. Undesirable pressure against the animal's mouth or nose is therefore eliminated and a much more comfortable drinking tank is provided for the animal. Also, the spherical shape of float 36 prevents the animal from biting the float and thereby damaging it.

The water supply system of tank 10 further includes an inlet conduit 50 having a lower end 52 connected to a water source and an upper end 54 extending above the water level within tank 10, an inlet valve 56 mounted on top of upper end 54 of inlet conduit 50, and a float 58 which rides upon the surface of the water within tank 10 and which is connected to valve 56 by a series of linkage arms 60. The water level in tank 10 is normally near the interior surface of top 12. When the water level is at its normal elevation, linkage arms 60 are in a folded position such that valve 56 is closed to prevent additional water from entering tank 10. As an animal drinks sufficient quanitites of water, float 58 recedes with the water level, thus extending linkage arms 60 and opening valve 56 to permit additional water from the water source to enter tank 10 through conduit 50. Upper end 54 of conduit 50 and inlet valve 56 always remain above the surface of the water. This is possible due to a raised dome 62 integrally formed with top 12 which houses upper end 54 of inlet conduit 50 and inlet valve 56. Dome 62 has an interior chamber 64 which provides an air pocket within tank 10 for inlet valve 56. Valve 56 is thus not subject to corrosion while the possibility of contamination of the water via valve 56 is eliminated.

Tank 10 also includes a recessed drainage area 66 within bottom 14, a drainage opening 68 adjacent the drainage area 66, and a plug 70 for closing opening 68. An overflow pipe 72 is also provided in tank 10 and has an upper end 74 positioned near the interior surface of top 12 and a lower end 76 connected to an outlet 78 in tank 10 which prevents the level of the water from rising above the interior surface of top 12.

It is therefore seen that the apparatus of the present invention accomplishes at least all of its stated objectives.

What is claimed is:

1. A livestock watering tank, comprising:
   an insulated tank for receiving water from a water source and having a top, a bottom and a sidewall, each of said top, bottom and sidewall having an interior surface and an exterior surface;
   an opening extending through said top disposed for access by the head of an animal;
   a buoyant spherical float for normally closing said opening and being rollable away from said opening in response to force applied to said float by the head of an animal seeking a drink whereby water is presented to the animal for drinking;
   a water inlet means connected to said water source and extending into said tank for supplying additional water to said tank when the water level therein recedes to a predetermined level,
   track means in said tank upon which said float rolls and which urges said float into closing relationship with said opening; and
   said track means including a pair of spaced apart elongated flanges attached to said interior surface of said top of said tank, each of said flanges having a first end adjacent said opening and a second end remote from said opening, said second ends of said flanges converging towards one another whereby said float engages and is submerged further into the water by said flanges when rolled away from said opening.

2. The tank of claim 1 wherein said float rolls along said flanges into sealing engagement with said opening when said force is removed from said float thereby closing said opening.

3. The tank of claim 1 wherein the water in said tank is maintained at a level below said opening but sufficiently high to hold said float against said interior surface of said top whereby said opening is normally closed by said float.

4. The tank of claim 1 wherein said float is constructed of insulating material and normally closes said opening to provide a thermal seal between the water in said tank and ambient air.

5. The tank of claim 1 further comprising drainage means for draining water from said tank.

6. The tank of claim 1 wherein said insulation of said tank is sufficient to prevent water therein from freezing during use of the tank in subfreezing ambient temperature environments.

7. The tank of claim 1 further including sealing means adjacent said first end of said flanges adapted to engage a portion of said float thereby sealing the interior of said tank from the ambient air when said float closes said opening.

8. The tank of claim 7 wherein said sealing means is an arcuately shaped flexible membrane attached to said top of said tank.

9. The tank of claim 7 wherein said sealing means is an arcuate member mounted in said top of said tank for vertical movement with respect to said top.

10. The tank of claim 9 wherein said top of said tank includes a recessed guide for restricting lateral movement of said arcuate member while permitting vertical movement of said arcuate member.

11. A livestock watering tank, comprising:
   an insulated tank for receiving water from a water source and having a top, a bottom and a sidewall, each of said top, bottom and sidewall having an interior surface and an exterior surface;
   an opening extending through said top disposed for access by the head of an animal;
   a buoyant spherical float for normally closing said opening and being rollable laterally away from said opening in response to force applied to said float by the head of an animal seeking a drink whereby water is presented to the animal for drinkage;
   a water inlet means connected to said water source and extending into said tank for supplying additional water to said tank when the water level therein recedes to a predetermined level,
   valve means for maintaining water in said tank at a level below said opening but sufficiently high to hold said float against said interior surface of said top whereby said opening is normally closed by said float, and
   track means at the interior surface of said top of said tank, said track means extending from said opening horizontally and laterally towards said sidewall, said track means being constructed to guide said spherical float downwardly and laterally away from said opening against the pressure of water in said tank tending to return said spherical float along said track to said opening.

* * * * *